United States Patent Office 3,094,322
Patented June 18, 1963

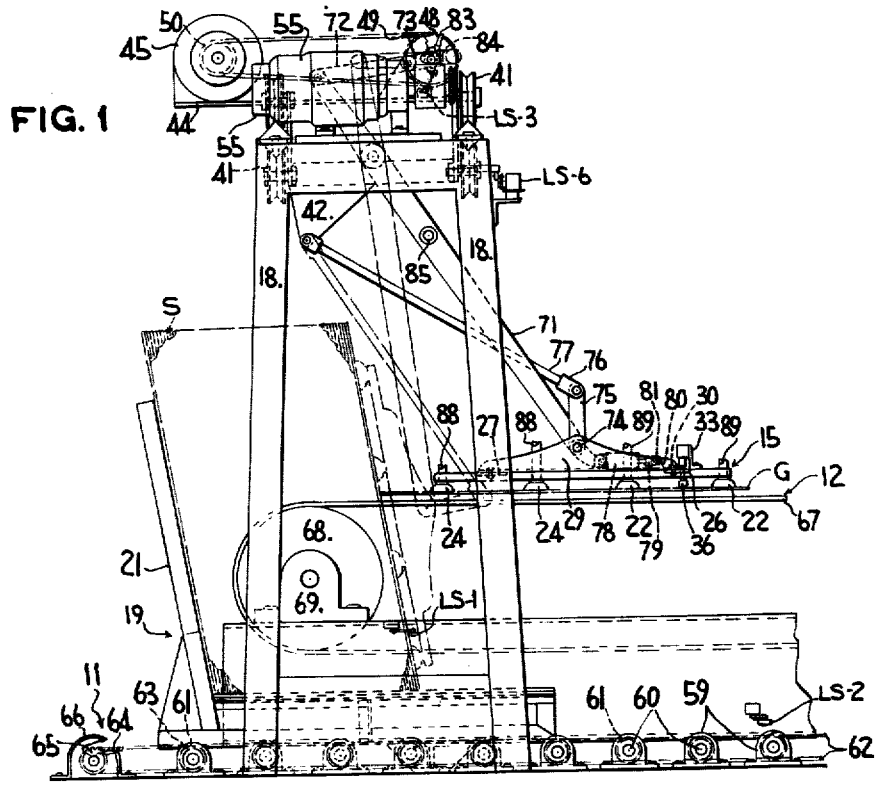
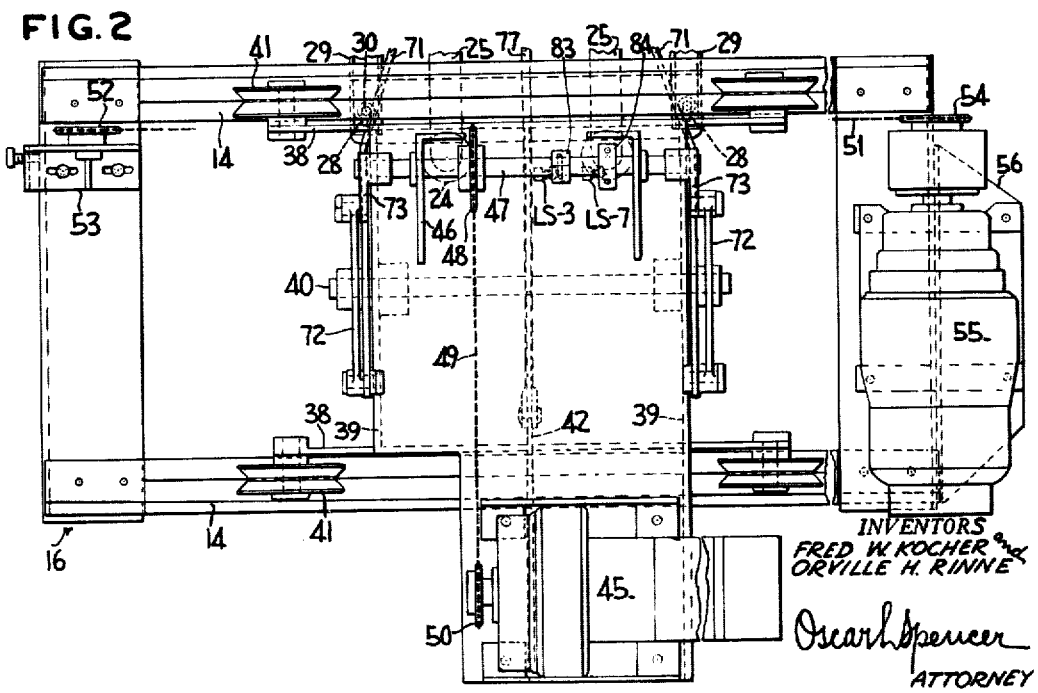

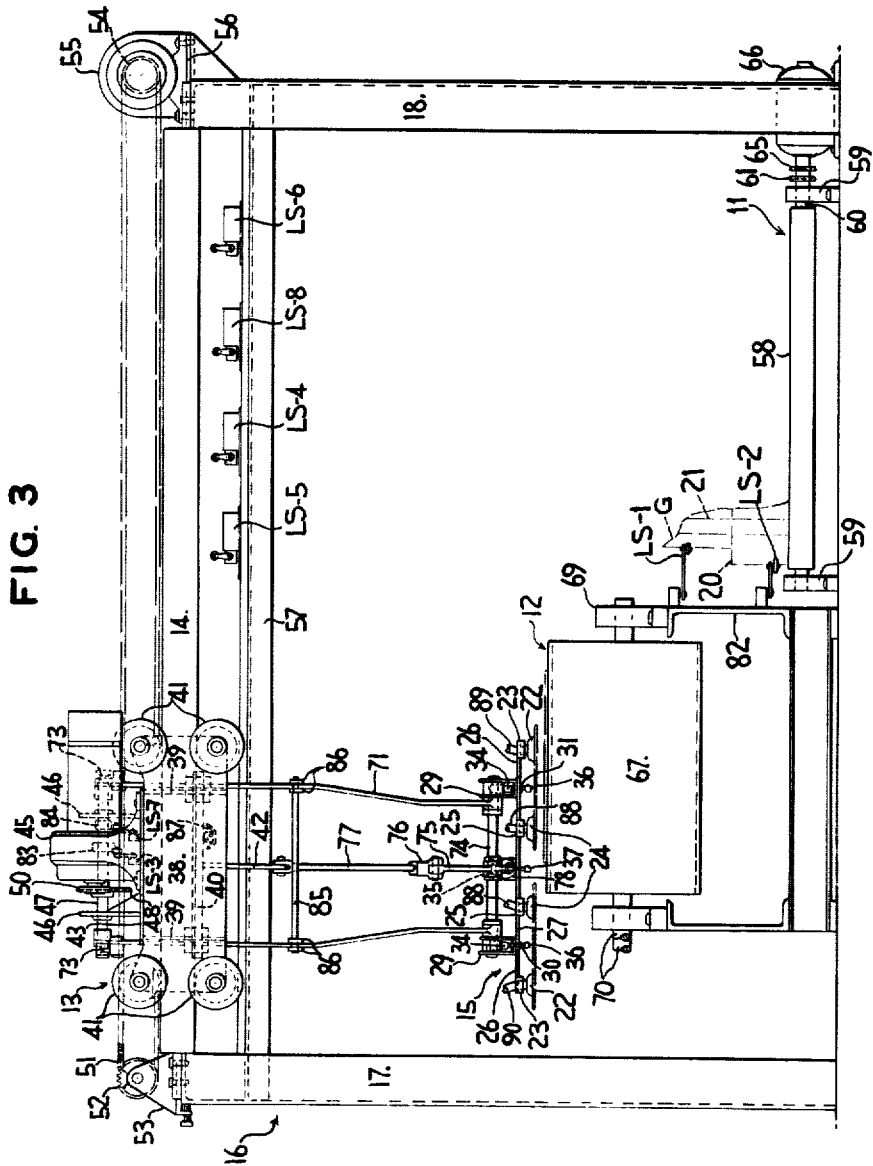

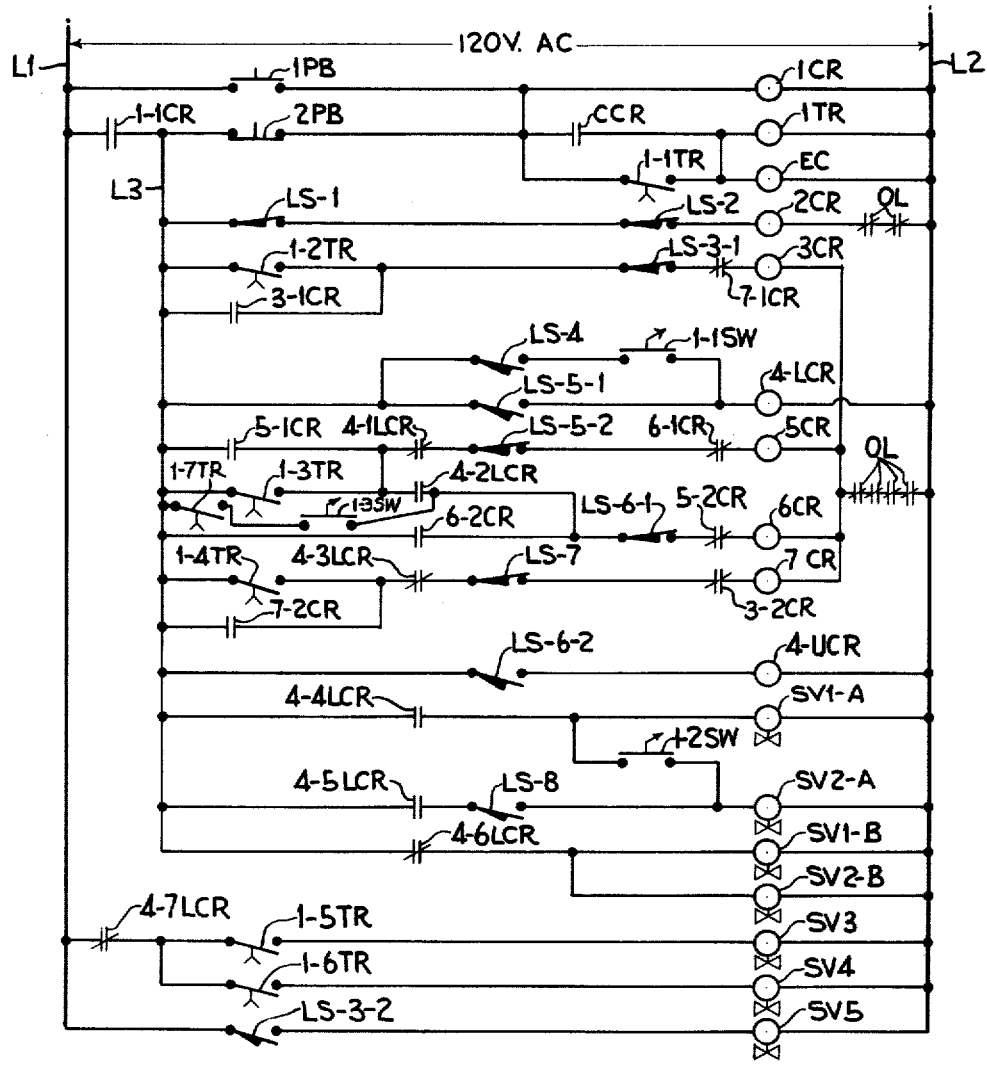

3,094,322
SHEET HANDLING APPARATUS
Fred W. Kocher, Festus, Mo., and Orville H. Rinne, Crestline, Ohio, assignors to Pittsburgh Plate Glass Company, Pittsburgh, Pa., a corporation of Pennsylvania
Filed Oct. 7, 1960, Ser. No. 61,266
5 Claims. (Cl. 271—12)

This invention relates to a sheet handling apparatus and more particularly relates to an apparatus for removing glass sheets individually from a stack of glass sheets in an inclined position, for moving the separated sheets to a horizontal position, for depositing the sheets individually and for moving the sheets in a horizontal path to a predetermined location.

It is customary to remove glass sheets individually from a stack of glass sheets by the use of a vacuum frame having vacuum cups which are brought into engagement with the outermost glass sheet of the stack. After the application of a vacuum to the cups to secure the cups to the face of the glass sheet, the vacuum frame is moved to remove the secured glass sheet from the stack. A natural vacuum exists between glass sheets of the stack and this renders difficult the removal of one glass sheet at a time from a stack. The vacuum between other sheets in the stack may be less than the vacuum between the sheet engaged by the vacuum cups and the adjacent or second sheet. When moving the vacuum frame with the cups secured to the outer sheet, the vacuum between that sheet may not be destroyed whereas the vacuum between the second and third sheets may be broken or destroyed. As a result, the frame moves two or more sheets adhered to one another until the vacuum between these sheets is broken and all sheets except the sheet adhered to the cups fall and break. This can result in a substantial loss of glass sheets.

It is an object of the present invention to provide an apparatus to break the natural vacuum that exists between a glass sheet being engaged by the vacuum cups on a frame and the adjacent sheet before movement of the vacuum frame for removal of glass sheets individually from a stack.

It is another object of this invention to provide an apparatus including a vacuum frame with vacuum cups for removing glass sheets individually from an inclined stack of glass sheets in which the apparatus is constructed to break the natural vacuum that exists between the outermost glass sheet and the adjacent sheet, to move the outermost glass sheet from the stack, to tilt the vacuum frame from an inclined position to a horizontal position, to move the vacuum frame to a position above a horizontal conveyor and to deposit the glass sheet on the conveyor for movement in a horizontal path to a predetermined location.

These and other objects of the present invention will be apparent to one skilled in the art from the following description of a preferred embodiment of the apparatus of this invention when taken in conjunction with the drawings in which the same numeral generally is used for the same or similar parts and in which:

FIG. 1 is a side elevation of the apparatus of the preferred embodiment;

FIG. 2 is a fragmentary plan of the apparatus shown in FIG. 1 with the conveyors omitted;

FIG. 3 is an elevation of the apparatus as viewed from the left of FIG. 1 with a fragmentary showing in phantom of the pallet and the glass mounted on the pallet; and FIG. 4 is an electrical schematic drawing of the automatic operating control of the apparatus.

The apparatus for the present invention comprises a vacuum frame including two rows of vacuum cups that have sheet-engaging surfaces in a common plane. There may be other vacuum cups mounted on the frame. The two rows of vacuum cups are spaced so that the vacuum cups of these rows contact the outer glass sheet of an inclined stack of glass sheets at the vertical margin, i.e., near the vertical edges of the glass sheet. A plunger with a free end is mounted on the vacuum frame between the two rows of vacuum cups and its location is approximately midway between the two rows. The apparatus includes means, such as an air cylinder, to move the plunger between first and second positions which places the free end of the plunger on opposite sides of the common plane of the sheet-engaging surfaces of the two rows of vacuum cups.

The apparatus of this invention includes means to tilt the vacuum frame to an inclined position where the common plane of the sheet-engaging surfaces of the vacuum cup is parallel to the inclined stack of glass sheets and means to move the stack automatically upon removal of a glass sheet to provide the new outermost glass sheet at a position engageable by the vacuum cups when the vacuum frame is at the inclined position. For the automatic stack movement the apparatus includes a pallet to support the stack in an inclined position, a conveyor and means to operate the conveyor after each removal of a glass sheet to place the new outermost glass sheet at the removal location. The apparatus includes means to communicate the vacuum cups with a vacuum source. The communicating means is actuated by means responsive to the positioning of the vacuum frame where it is lowered to the inclined position at which the cups abut the outermost glass sheet. The plunger is operated by the apparatus while the vacuum cups engage the glass sheet so that the free end of the plunger abuts the central portion of the glass sheet which prevents the plunger being moved to its maximum position that is ahead of the vacuum cups. The movement of the plunger relative to the frame is prevented by the sheet until the frame begins its movement away from the stack. When the frame is moved away from the stack, the cups provide a pulling force on the engaged glass sheet in the direction of movement of the frame and the plunger opposes this movement at the central portion of the glass sheet. The plunger provides a force in a direction opposite to the direction of movement provided by the vacuum cups engaging the margin of the sheet during the movement of the frame away from the stack. As a result, the sheet is bowed about an axis in a plane between the rows of vacuum cups thereby breaking the natural vacuum that exists between the engaged sheet and the adjacent sheet.

The apparatus further includes means to tilt the vacuum frame then to a horizontal position and a carriage to move the vacuum frame in its horizontal position in a path parallel to the axis of tilting of the vacuum frame to position the vacuum frame above a horizontal conveyor. Means to break the vacuum in the cups is actuated upon arrival of the vacuum frame above the horizontal conveyor whereby the glass sheet is deposited upon the conveyor for travel in a horizontal path of direction. The automatic control of the apparatus operates the drive for the carriage to return the vacuum frame to the position where the means to tilt the vacuum frame is operated.

The vacuum frame can have four rows of vacuum cups with plungers between each row so that an outer row and an adjacent intermediate row can be utilized with that plunger which is between them to break the vacuum of the glass sheet in a stack which has dimensions for each sheet such that these two rows abut the vertical margin of the sheet. Two such stacks of glass sheets can have one sheet from each removed simultaneously by the vacuum frame through the breaking of the natural vacuum between these sheets and the adjacent sheets of the stacks. In this instance the intermediate plunger is not utilized. The automatic control is operated to provide this alternative function. The two glass sheets after removal from the stacks are moved by the vacuum frame to the horizontal position. When the carriage moves across the horizontal conveyor, the trailing glass sheet is released by the automatic control of the apparatus functioning to break the vacuum in two rows of cups. During the return travel of the carriage toward the position where the vacuum frame is inclined, the other glass sheet is released from the other two rows of cups of the vacuum frame by automatically breaking the vacuum in them as the glass sheet is over the horizontal conveyor thereby spacing the two glass sheets on the horizontal conveyor.

The apparatus of the preferred embodiment includes a conveyor generally indicated at 11, a conveyor generally indicated at 12, a carriage 13 mounted on a pair of tracks 14, and a vacuum frame generally indicated at 15. The apparatus has a supporting structure generally indicated at 16 including a pair of supports 17 and a pair of supports 18. One of tracks 14 is mounted as its ends on supports 17 and 18 and the ends of the other track 14 are mounted on the upper ends of the other supports 17 and 18. The conveyors 11 and 12 provide paths of movement which are parallel to each other but the horizontal plane of support of conveyor 12 is above the plane of support of conveyor 11. As described below, the vacuum frame 15 is mounted on carriage 13 for movement between a horizontal position and a lower inclined position. The apparatus also includes a pallet generally indicated at 19 having a base 20 for supporting the bottom of an inclined stack S of glass sheets G. The base 20 of pallet 19 rests on conveyor 11. The pallet 19 has an inclined side 21 against which stack S rests. The side 21 extends upwardly from base 20 in a direction rearwardly, i.e., opposite to the forward direction of travel afforded by conveyors 11 and 12.

The vacuum frame 15 includes two rows of two vacuum cups 22 mounted on support plates 23 and two rows of four vacuum cups 24 mounted on two longer support plates 25. The support plates 23 intermediate their ends and support plates 25 between an end vacuum cup 24 and an adjacent cup 24 of each plate 25 are connected to a tie plate 26 whereas the support plates 25 near their other end between the other end cup 24 and the adjacent cup 24 are connected to a tie plate 27. Near their ends but between support plates 23 and 25 tie plate 26 has slots 28 which have their greater dimension parallel to the rows of vacuum cups 22 and 24. The tie plate 27 near its ends also has slots 28. The tie plates 26 and 27 are mounted on a pair of arms 29 by pins 30 extending through the base of arms 29 and slots 28 in tie plates 26 and 27 which are below arms 29. Nuts 31 are threaded on the bottom ends of pins 30 to complete the support of tie plates 26 and 27 by arms 29. With this construction there can be movement of tie plates 26 and 27, support plates 23 and 25 and vacuum cups 22 and 24 relative to arms 29 in a direction parallel to the direction of arrangement of the rows of vacuum cups 22 and 24.

Brackets 33 support air cylinder 34 and air cylinders 35 on tie plate 26. Rubber-covered plungers 36 are mounted on the end of the piston rods of air cylinders 34. Similarly, a rubber-covered plunger 37 is mounted on the end of the piston rod of air cylinder 35. The piston rods 36 and 37 extend downwardly through tie plate 26. When vacuum frame 15 is in the inclined position, tie plate 26 is lower than tie plate 27. With this construction either plungers 36 or plunger 37 can be moved by the operation of the associated air cylinders so the moved plunger will extend beyond the plane of the sheet-contacting vacuum cups 22 and 24 when the cups are being moved away from the stack. This causes a bowing of an engaged glass sheet engaged by the cups. The bowing breaks the vacuum between that sheet and the next sheet G of stack S.

When each sheet G of a stack S has dimensions greater than the distance between the end vacuum cups 24 of either row of vacuum cups 24, the sheet G extends beyond vacuum cups 22 in two rows. For such sheets G air cylinder 35 is operated to move plunger 37 into pushing engagement with sheet G. When pallet 19 supports two stacks S of glass sheets G and sheets G in each stack S has dimensions in both directions that are somewhat greater than the distance between vacuum cup 22 and adjacent vacuum cup 24, air cylinders 34 are used to move plungers 36 against stacks S. When vacuum cups 22 of one of the rows and two of the vacuum cups 24 of the adjacent row of vacuum cups 24 engage the outer sheet G of one of stacks S at its margin and provide a pulling force on sheet G forwardly, plunger 36 is preventing forward movement of sheet G in its central portion. This results in bowing of sheet G of that stack. Similarly, the bowing of sheet G in the other stack S on pallet 19 is provided by two of vacuum cups 22 and two of vacuum cups 24 in combination with the prevention of forward movement of the central portion of the sheet by the other plunger 36 through the operation of the other air cylinder 34. From this description it is seen that the vacuum frame includes vacuum cups to engage the side margins of a glass sheet for forward movement of these margins and further includes a plunger disposed approximately midway between these side margins to oppose forward movement in the central portion of the sheet and the resultant bowing of sheet G releases the vacuum between that sheet and the next sheet G of stack S. As described below, this operation occurs when the vacuum frame 15 is being moved from the inclined position where the vacuum cups have their sheet-engaging surfaces parallel to and abutting the inclined forward face of stack S and while the abutting cups are connected to a vacuum source.

The carriage 13 has a pair of plates 38 disposed parallel to the path of travel of carriage 13 on tracks 14. The carriage also includes plates 39 connected to plates 38 which rotatably support a shaft 40 for rotation about an axis parallel to the path of travel of carriage 13. Each plate 38 rotatably supports four wheels 41. Two of wheels 41 on each plate 38 engage the upper surface of one of tracks 14 and the other two wheels 41 engage the under surface of track 14.

The carriage 13 also includes a downwardly extending central plate 42 and a top central plate 43. An extension 44 of plate 43 supports a motor 45. The top plate 43 of carriage 13 supports a pair of brackets 46 through which are journaled a shaft 47. A sprocket 48 keyed on shaft 47 is driven by a chain 49 extending around a sprocket 50 keyed on the shaft of electric motor 45, which is of a conventional construction. Its shaft cannot be rotated except when the coil of its starter relay is energized.

The tracks 14 provide a direction of travel of carriage 13 normal to the path of travel provided by conveyors 11 and 12. The carriage 13 is moved by a chain 51 connected at its ends to one of plates 38. The chain 51 extends around an idler sprocket 52 journaled on a bracket 53, which adjustably is mounted on one of supports 17, and a sprocket 54 keyed on the shaft of an electric motor 55 mounted on a bracket 56 mounted on one of supports 18.

A horizontal angle iron 57 is supported at its ends by supports 17 and 18. The angle iron 57 supports four limit switches which are described later.

The conveyor 11 includes rolls 58 rotatably mounted on bearings 59. The shafts 60 of rolls 58 have keyed on them sprockets 61 which are engaged by a chain 62. A sprocket 63 is also keyed on one of shafts 60. The sprocket 63 is engaged by a chain 64 which engages a sprocket 65 keyed on the shaft of an electric motor 66 to rotate rolls 58 of conveyor 11.

In the preferred embodiment the conveyor 12 includes a belt 67 that extends around a pair of pulleys 68 which are journaled in bearings 69 by shafts 70 of pulleys 68. The shaft 70 of the pulley which is not shown in the drawings is driven by a motor (not shown). The conveyor 12 has a support (not shown) of the conventional type for the top horizontal run of belt 67. The glass sheet G on belt 67 is conveyed to a predetermined location, e.g., a station for a cutting operation. When sheet G reaches this station, the belt conveyor stops until the cutting operation is completed; then the conveyor resumes the movement of sheet G.

The shaft 40 mounted on carriage 13 has keyed on its ends a pair of levers 71. A link 72 is pivotally connected to the top end of each lever 71. Each link 72 is pivotally connected at its other end to a crank arm 73. The crank arms 73 are keyed on shaft 47 on which sprocket 48 is keyed. When sprocket 48 rotates in a clockwise direction (as viewed in FIG. 1) through 180 degrees, crank arms 73 move links 72 from left to right (as viewed in FIG. 1) thereby pivoting levers 71 in a clockwise direction about their pivotal axis of mounting on shaft 40. Thus, levers 71, links 72 and crank arms 73 are moved to the position shown in phantom in FIG. 1.

The levers 71 at their lower ends rotatably support the ends of a shaft 74. Between levers 71 a crank 75 is keyed on shaft 74. The top arm of crank 76 is pivotally connected to a clevis 76 threaded on a connecting rod 77 pivotally mounted on downwardly extending plate 42 of carriage 13. The other arm of crank 76 provides a pivotal mounting for an air cylinder 78. A clevis 79 is connected to the piston rod of air cylinder 78. The clevis 79 is pivotally connected to a support bracket 80 mounted on tie plate 26. The clevis 79 and the bracket 80 are pivotally connected by a pin 81.

The arms 29 are keyed on shaft 74 so that the movement of crank 75 results in the pivotal movement of arms 29. The crank 75 provides this movement when levers 71 pivot about shaft 40 because connecting rod 77 is forced to pivot about its piovtal axis of support at plate 42 with the result that the movement of levers 71 and the pivotal movement of crank 75 to the position shown in phantom lines in FIG. 1 results in the movement of arms 29 from a horizontal upper position to a lower tilted or inclined position so that vacuum cups 22 and 24 face and abut the inclined front surface of stack S.

When vacuum frame 15 is in the inclined position shown in phantom in FIG. 1, the retraction of the piston rod of air cylinder 78 results in the upward inclined movement of tie plate 26 and thus the same movement of tie plate 27, support plates 23 and 25 and vacuum cups 22 and 24. As described later, this movement is provided when a vacuum is in the vacuum cups 22 and 24 engaging the side margins of the glass sheet and the appropriate plunger 36 or plunger 37 is abutting the central portion of sheet G. Very shortly after this lifting movement afforded by the operation of air cylinder 78, motor 45 is started to move cranks 73 through the next 180 degrees of rotation of sprocket 48 for the return pivotal movement of levers 71. The vacuum frame 15 is thus moved from the inclined position shown in phantom to the horizontal position shown in full lines. As described later, when vacuum frame 15 is lifted to the horizontal position, air cylinder 78 is operated to extend its piston rod for the movement of tie plates 26 and 27 to their original position. This moves from left to right, as viewed in FIG. 1, vacuum cups 22 and 24, support plates 23 and 25, and tie plates 26 and 27.

The apparatus has eight limit switches which are designated LS-1 through LS-8. The switch LS-1 of the normally closed type is mounted on one of channel irons 82 supporting one of the rows of bearings 69 so that switch LS-1 is tripped open by the outermost sheet G of stack S during movement of pallet 19 afforded by conveyor 11. The switch LS-2, of the normally closed type, is also mounted on channel iron 82 at a position to be tripped by the base 20 of pallet 19 when the latter has been moved to place the last glass sheet G at the location where the sheets are removed one at a time by vacuum frame 15 from pallet 19. The switch LS-3 has a normally closed contact LS-3-1 and a normally open contact LS-3-2. The switch LS-3 is tripped by a cam 83 fixed on shaft 47 when frame 15 is at the raised horizontal position shown in FIG. 3. The switch LS-4 is of the normally open type. The switch LS-5 has a normally open contact LS-5-1 and a normally closed contact LS-5-2. The switch LS-6 has a normally closed contact LS-6-1 and a normally open contact LS-6-2. The switch LS-7 is of the normally closed type and is tripped open by a cam 84 fixed on shaft 47 when frame 15 is at the lower inclined position shown in phantom in FIG. 1. The switch LS-8 is of the normally open type.

A tie rod 85 connects levers 71 between shaft 40 and the lower ends. The tie rod is held in place by nuts 86.

The switches LS-4, LS-5, LS-6 and LS-8 are mounted on angle iron 57 but are located at positions other than shown in FIG. 3 but in the order. These switches are tripped by a limit switch operator 87 mounted on one of plates 38 of carriage 13. The switch LS-5 is tripped when frame 15 is at the position shown in FIG. 3 so that when two sheets G are supported by frame 15 the trailing sheet (to the right as viewed in FIG. 3) is above conveyor 12. The switch LS-4 is tripped when frame is centrally located over conveyor 12 so that one larger sheet supported by all cups 22 and 24 is entirely above conveyor 12.

The switch LS-8 is located on angle iron 57 so that it is tripped by operator 87 when frame 15 is at a position offset to the right with respect to conveyor 12 as much as it is offset to the left in FIG. 3. As a result, the smaller glass sheet G at the lefthand portion (as viewed in FIG. 3) of the frame 15 is entirely above conveyor 12. This glass sheet G is the leading sheet when carriage 13 is moved forward, i.e., from right to left (as viewed in FIG. 3). The switch LS-6 is mounted so that it is tripped by operator 87 when frame 15 is located directly in front of pallet 19.

Two of the four vacuum cups 24 that are on one of support plates 25 on opposite sides of and adjacent plate 27 are connected by pipes 88 through a manually operated valve (not shown) to a double-solenoid, 4-way valve (not shown) having solenoids SV1-A and SV1-B. The two of the four vacuum cups that are on the other support plate 25 adjacent plate 27 are connected by pipes 88 and through another manually operated valve (not shown) to an outlet at a double-solenoid, 4-way valve (not shown) having solenoids SV2-A and SV2-B. The third outlet of each valve is connected to capped pipes and thus are not used except to prevent loss of vacuum from the source when it is connected through the inlets to these outlets. When solenoids SV1-A and SV2-A are energized, the inlets of the two 4-way valves, which are connected to a vacuum source (not shown), are in communication by an outlet of each to the four pipes 88 if the manually operated valves are open, and solenoids SV1-B and SV2-B are energized, the 4-way valves connect pipes 88 to the exhaust outlets, i.e., to the atmosphere. Thus, assuming the manual valve is open, the energization of solenoids SV1-A and SV2-A provide a vacuum in pipes 88 and the energization of solenoids SV1-B and SV2-B break the vacuum in pipes 88.

Two of vacuum cups 24 on opposite sides of tie plate 26 and the two vacuum cups 22 on the adjacent support plate 23, i.e., vacuum cups 22 and 24 in the two rows to the right (as viewed in FIG. 3) are connected by pipes 89 to the outlet of the valve having solenoids SV1-A and SV1-B to which two of pipes 88 are connected by the manually operated valve. These pipes 89 from cups 22 are connected directly to the 4-way valve. The pipes 89 from cups 22 are connected to the 4-way valve through a manually operated valve which is open except when all cups 24 only are to be used, with plunger 37, to pick up and transfer a high and narrow sheet in a single stack on pallet 19 instead of one or two sheets of sheets which are generally square. Thus, these two cups 22, with the manual valve open, and two cups 24 are evacuated when solenoid SV1–A is energized and the vacuum is destroyed when solenoid SV1–B is energized. Of course, when the valve connecting hose 88 to the 4-way valve is closed, the energization of solenoid SV1–A does not provide a vacuum in hoses 88.

The vacuum cups 24 on opposite sides and adjacent tie plate 26 and on the other support plate 25 and the two adjacent cups 22 on the other support plate 23 are connected by pipes 90 to the outlet of a double-solenoid, 4-way valve (not shown) having solenoids SV2–A and SV2–B to which two hoses 88 are connected. When solenoid SV2–A is energized, the valve is operated to communicate the vacuum source with hoses 90 and when solenoid SV2–B is energized, the valve is operated to communicate hoses 90 with the exhaust. The hoses 90 connected to cups 22 are connected by a manually operated valve to the 4-way valve whereas hoses 90 connected to cups 24 are connected directly to the same outlet. This manual valve is closed when the manual valve is connecting hoses 89 from the other cups 22 to the other 4-way valve and this is done when removing from a stack sheets having top and bottom edges above and below the end cups 24 of the two rows and side edge between the rows of cups 24 and adjacent rows of cups 22.

The air cylinders 34 and air cylinder 35 are spring urged in one direction and urged in the opposite direction by air pressure which is introduced only into one chamber of each air cylinder through a single-solenoid, 3-way valve when its solenoid SV3 is energized. When solenoid SV3 is not energized, the air pressure in the one chamber of the air cylinders is released through an exhaust outlet of the 3-way valve. Separate manually operated valves are in the pipes connecting cylinders 34 and cylinder 35 to the outlet of the 3-way valve. Of course, the inlet of the 3-way valve is connected to a source of pressurized air. When plungers 36 are to be extended for the bowing of two glass sheets in separate stacks, solenoid SV3 is energized and the manual valves in the pipes to air cylinders 34 are open. When plunger 37 is to be moved to the operative position for the bowing of a glass sheet, the manual valve connecting air cylinder 35 to the 3-way valve is opened, the manual valves to air cylinders 34 are closed and solenoid SV3 is energized.

The source of pressurized air is also connected to an inlet of a double-solenoid, 4-way valve having solenoids SV4 and SV5. One outlet of the valve is an exhaust outlet. The other two outlets of the 4-way valve are connected to the chambers of air cylinder 78. The energization of solenoid SV4 moves the spool of this 4-way valve to the position where pressurized air is introduced into one chamber and the other chamber is connected to the exhaust outlet so that the piston rod of air cylinder 78 retracts. When solenoid SV5 is energized, the piston rod of the air cylinder is returned to its extended or normal position. The latter occurs when vacuum frame 15 is moved to its horizontal position by the rotation of shaft 47 to the position at which cam 83 trips switch LS–3, thereby closing contact LS–3–2. The solenoid SV4 is energized when contact 1–6TR is closed at the initiation of the energization of coil 1TR.

Referring to FIG. 4, electrical lines L1 and L2 are connected to a 120-volt A.C. source (not shown). A circuit containing a normally open pushbutton switch 1PB and a coil 1CR of a relay, having a normally open contact 1–1CR, is connected to lines L1 and L2. A sub-circuit in parallel with switch 1PB contains contact 1–1CR and a normally closed pushbutton switch 2PB in series with each other and with coil 1CR. When an operator momentarily closes switch 1PB, coil 1CR is energized to close contact 1–1CR, thereby providing a holding circuit for coil 1CR and at the same time energizing electrical line L3 which is connected to line L1 by contact 1–1CR. To deenergize line L3 an operator momentarily opens switch 2PB of the holding circuit to deenergize coil 1CR and open contact 1–2CR.

Another circuit of FIG. 4 is connected to line L1 through line L3 and contact 1–1CR. This circuit includes a normally open contact CCR of a motor starter relay for the motor (not shown) that operates conveyor 12. Thus, contact CCR is closed only when conveyor 12 is operating. This circuit has contact CCR in series with a coil 1TR of a starter relay of a sequence timer, which has normally open contacts 1–1TR, 1–2TR, 1–3TR, 1–4TR, 1–5TR, 1–6TR and 1–7TR and which is a type well known, such as a Multiflex Sequence Timer. This timer can be set so that during the energization of its coil 1TR each of the contacts will be closed for a predetermined time. For example, contact 1–1TR is closed at the beginning of the energization of coil 1TR and remains closed for 12.5 seconds. The contact 1–2TR closes 1.5 seconds after the start of energization of coil 1TR and opens 3 seconds after the start of energization of coil 1TR. The contact 1–3TR is set to close 5.75 seconds after the energization of coil 1TR and remains closed for 0.75 second. The contact 1–7TR is set to close 9 seconds after the energization of coil 1TR and to open 1 second later. The contact 1–4TR closes 11.5 seconds after the start of energization of coil 1TR and opens 12.5 seconds after this energization of coil 1TR. The contact 1–5TR closes upon energization of coil 1TR and remains closed for 3 seconds while contact 1–6TR closes upon the energization of coil 1TR and opens after 0.75 second.

Assuming coil 1CR has been energized as described above, coil 1TR of the sequence timer is energized when contact CCR closes and thus contact 1–1TR immediately closes and remains closed for 12.5 seconds. Before the contact 1–1TR opens, the operation of conveyor 12 ceases so that contact CCR opens before the 12.5 seconds has elapsed. The conveyor 12 stops when it has a glass sheet into an operating station, such as a cutting station, which forms no part of the present invention. After this operation on the glass sheet, which is initially placed on conveyor 12 by the apparatus of the present invention, the starter relay for the motor that drives conveyor 12 is operated to drive the conveyor. When the coil of this relay is energized, contact CCR of the relay closes to initiate another operation of the sequence timer having coil 1TR. Thus, the operation of the apparatus of this invention after one complete cycle, as described below, will start when conveyor 12 is started.

A coil EC of an electrical clutch of the sequence timer is in parallel with coil 1TR and in series with contact 1–1TR as well as in series with contact CCR. As seen in FIG. 4, contact 1–1TR is in parallel with contact CCR. The coil EC is energized when contact CCR closes and its energization after contact CCR opens continues until contact 1–1TR opens. When coils 1TR and EC are deenergized, the sequence timer is returned to its initial condition. It will then initiate the closing of contacts 1–1TR through 1–6TR at the times and for the periods described above whenever contact CCR closes again.

A circuit connected to lines L3 and L2 includes switches LS1 and LS2, a coil 2CR of a starter relay for motor 66 and normally closed contacts OL which are in the overload relay for motor 66. The contacts OL are present to protect the motor from excessive current; this use of contacts OL is well known in the art. When a pallet 19 is not on conveyor 11, switches LS1 and LS2 are closed and if contact 1–1CR is closed coil 2CR is energized and conveyor 11 is operating. When an operator places a pallet 19 on rolls 58 at the lefthand end (as viewed in FIG. 1) of conveyor 11, pallet 19 will be moved to the right until switch LS1 is tripped open by the outermost glass sheet G of stack S on pallet 19. When this happens, coil 2CR is deenergized and motor 66 stops. When this sheet G is removed by vacuum frame 15, as described later, the arm of switch LS1 is momentarily further pivoted. As soon as sheet G engaged by vacuum frame 15 has been moved completely away, switch LS1 reverts to its normally closed position. This results in the energization again of coil 2CR to operate motor 66 until stack S again trips switch LS1 closed. This sequence of events is repeated until the last sheet G of stack S is to be removed. At this time base 20 of pallet 19 trips open switch LS2. The subsequent removal of the last sheet G results in the closing of switch LS1 but coil 2CR is not energized because switch LS2 is now open. When the last sheet G is removed, the operator pushes pallet 19 to the right and off conveyor 11 and replaces it with another pallet 19 loaded with a stack S of sheets G.

Five additional circuits are connected to lines L2 and L3. These five circuits contain coils 3CR, 4–LCR, 5CR, 6CR and 7CR, respectively. The coils 3CR and 7CR are coils of starter relays that are used alternately to operate motor 45. The coils 5CR and 6CR are coils of starter relays that are used to operate motor 55 in the forward and reverse direction, respectively. The forward direction is from right to left, as viewed in FIGS. 2 and 3. The coils 3CR and 5CR through 7CR are connected to line L2 through the same four normally closed contacts OL. Two of these contacts OL are in the overload relay for motor 45 and the other two contacts OL are in the overload relay for motor 55. These overload relays containing contacts OL are safety relays.

The coil 4–LCR is a coil of a mechanical latch contactor which consists of a coil- or solenoid-operated contactor and a latching contactor. This mechanical latch contactor also has as its latching solenoid or coil 4–UCR referred to below. The operation of the mechanical latch contactor is such that when the contactor coil 4–LCR is momentarily energized the contactor closes and a latching arm moves into place below the solenoid armature to lock the contactor in the closed position. To release the contactor, it is necessary to momentarily energize the latching solenoid or coil 4–UCR. This releases the mechanical latch, thereby allowing the contactor to open. In the present instance, the contactor constitutes seven contacts, which are shown in FIG. 4 and which are designated 4–1LCR through 4–7LCR. The contacts 4–1LCR, 4–3LCR, 4–6LCR and 4–7LCR are normally closed and contacts 4–2LCR, 4–4LCR and 4–5LCR are normally open. Thus, the momentary energization of coil 4–LCR opens contacts 4–1LCR, 4–3LCR, 4–6LCR and 4–7LCR and closes contacts 4–2LCR, 4–4LCR and 4–5LCR. This condition continues until coil 4–UCR is energized, as described below, when these seven contacts revert to their normal condition.

The relay having coil 3CR has a normally open contact 3–1CR and a normally closed contact 3–2CR. The relay having coil 5CR has a normally open contact 5–1CR and a normally closed contact 5–2CR. The relay having coil 6CR has a normally closed contact 6–1CR and a normally open contact 6–2CR. The relay having coil 7CR has a normally closed contact 7–1CR and a normally open contact 7–2CR.

The circuit containing coil 3CR includes in series with it contact 1–2TR, normally closed contact LS–3–1 of limit switch LS–3 and contact 7–1CR. The contact 3–1CR is in a subcircuit in parallel with contact 1–2TR and in series with contacts LS–3–1 and 7–1CR and coil 3CR. When contact 1–2TR closes, coil 3CR is energized. When contact 1–2TR opens, energization of coil 3CR continues through contact 3–1CR until contact LS–3–1 opens. When coil 3CR is energized, motor 45 operates to rotate shaft 47 until cam 83 trips switch LS–3 to open contact LS–3–1. This occurs when shaft 47 has been rotated through 180 degrees. The motor 45 is of a conventional type that includes a brake to prevent further rotation of its shaft until either coil 3CR or coil 7CR is energized. This period of energization of coil 3CR results in motor 45 moving one end of crank arm 73 in a clockwise direction 180 degrees, as viewed in FIG. 1. The links 72 are pulled to the right to pivot levers 71 about shaft 40, thereby moving vacuum frame 15 to the left (as viewed in FIG. 1). Because of connecting rod 77 vacuum frame 15 is also moved from the horizontal position to the inclined position where its vacuum cups 22 and 24 have their sheet-engaging surfaces parallel to, facing and abutting the outermost sheet G of stack S.

The circuit containing coil 4–LCR includes normally open contact LS–5–1 of limit switch LS–5. In series with coil 4–LCR is a subcircuit containing switch LS–4 and a contact 1–1SW of a selector switch, which is shown in FIG. 4 in the open position. This selector switch also has a contact 1–2SW, which is shown in FIG. 4 in the open position. When the selector switch is operated to close contact 1–1SW, contact 1–2SW is also closed. This is done when vacuum frame 15 is utilized to pick up one large glass sheet G whereas contacts 1–1SW and 1–2SW are in the open position when the apparatus is used so that vacuum frame 15 picks up one sheet each from two stacks of smaller glass sheets on pallet 19.

In a circuit in series with coil 5CR are contacts 4–1LCR, 5–1CR and 6–1CR and normally closed contact LS–5–2 of limit switch LS–5. The coil 6CR is in a circuit in series with contacts 5–2CR and 6–2CR and normally closed contact LS–6–1 of limit switch LS–6. The contact 1–3TR is in a subcircuit in parallel with contact 5–1CR and thus is in series with contacts 4–1LCR, 6–1CR and LS–5–2 and coil 5CR. In addition, contact 1–3TR is in a subcircuit in series with contact 4–2LCR and this subcircuit is in parallel with contact 6–2CR and is in series with contacts 5–2CR and LS–6–1 and coil 6CR. The contact 1–7TR is in parallel with contacts 1–3TR and 4–2LCR and in series with contact 1–3SW, of the selector switch which has contacts 1–1SW and 1–2SW, contacts LS–6–1 and 5–2CR and coil 6CR.

The coil 7CR is in a circuit in series with contacts 1–4TR, 3–2CR and 4–3LCR and switch LS–7. The holding subcircuit for coil 7CR includes contact 7–2CR in parallel with contact 1–4TR and this subcircuit is in series with contacts 3–2CR and 4–3LCR, switch LS–7 and coil 7CR.

The coil 4–UCR is in a circuit also connected to lines L2 and L3. The normally open contact LS–6–2 of switch LS–6 is in this circuit in series with coil 4–UCR.

The solenoids SV1–A, SV1–B, SV2–A and SV2–B are in four circuits connected to lines L2 and L3. In one of these circuits solenoid SV1–A is in series with contact 4–4LCR. The solenoid SV2–A is in another circuit in series with contact 4–5LCR and switch LS–8. In addition, solenoid SV2–A is connected to line L3 through contact 4–4LCR by contact 1–2SW mentioned above. The solenoids SV1–B and SV2–B are in parallel with each other but in series with contact 4–6LCR to form two circuits.

The solenoids SV3, SV4 and SV5 are connected to line L2 and are connected to line L1 directly rather than through line L3. The solenoid SV3 is connected to line L3 through contacts 1–5TR and 4–7LCR. The solenoid SV4 is connected to line L4 through contacts 1–6TR and 4–7LCR. The solenoid SV5 is connected to line L3 through normally open contact LS–3–2 of limit switch LS–3.

Each of vacuum cups 22 and 24 includes a conventional rubber cup with an opening at its top and which is mounted on the bottom of tubes that extends through the rubber cup and upwardly through a housing mounted on plates 23 and 25. A spring is in each housing and surrounds the tube that extends from the rubber cup and through the housing so that each vacuum cup is resiliently urged away from tilt frame 15. When the vacuum frame is at the inclined lowered position, the vacuum cups when abutted by the sheet move the tubes so that the springs in the housings are compressed. This arrangement assures that all vacuum cups are in proper alignment for abutment with the glass sheet; otherwise, only some of the vacuum cups to be used will abut the glass sheet. When the plunger or plungers are operated through the energization of solenoid SV3, the free end of the plunger or the free ends of the operative plungers initially are brought into abutment with glass sheet which prevents further movement of the piston rod of the air cylinder or piston rods of the air cylinders being operated.

When the vacuum frame is being moved away from stack S, the vacuum cups will have initially relative movement with respect to plates 23 and 25 until the springs reach their maximum amount of compression. Then the vacuum cups will move with plates 23 and 25. As the vacuum cups and plates 23 and 25 are being moved away from stack S the plunger or plungers continue to provide the force in the central portion of the glass sheet or the central portions of the two glass sheets with the result that the free end of the plunger or the free ends of the plungers remain in abutment with the glass sheet while the vacuum cups are moving the marginal portions of the glass sheet or the marginal portions of the glass sheets with vacuum frame 15. This movement of the vacuum cups in one direction with the force provided by the plunger or plungers in the opposite direction results in the bowing of the glass sheet or glass sheets. This bowing breaks the vacuum. This bowing continues until contact 1–5TR opens.

*Operation*

It is assumed that the selector switch having contacts 1–1SW, 1–2SW and 1–3SW is in the position in which these contacts are closed and that pallet 19 supports a single stack of large glass sheets so that all vacuum cups 22 and 24 are to be utilized. The contact 1–3TR is set to close 10 seconds after energization of coil 1TR and to open 1 second later. It is assumed that conveyor 12 is not yet operating. The pallet 19 is placed on conveyor 11. The switches LS–1 and LS–2 are in closed position. The coil 1CR is energized, as described above, by momentarily closing switch 1PB. The coil 2CR is then energized and remains energized until the outermost glass sheet G of stack S trips open switch LS–1.

The manual valves connecting pipes 88 to the 4-way valves having solenoids SV1–A and SV1–B and having solenoids SV2–A and SV2–B are open. The manual valves connecting some of pipes 89 and some of pipes 90 to these 4-way valves are also open. As a result, all vacuum cups 22 and 24 are operatively connected to these two 4-way valves. The manual valves, that connect air cylinders 34 to the 3-way valve having solenoid SV3, are closed and the valve connecting air cylinder 35 to this valve is open so that only plunger 37 will later cooperate with the vacuum cups to bow the large glass sheet in order to break the natural vacuum between it and the adjacent glass sheet.

It is assumed further that initially carriage 13 is located so that limit switch LS–4 is tripped closed by operator 87. In this position carriage 13 is centrally located above the longitudinal axis of conveyor 12. The vacuum frame is in the raised horizontal position so that cam 83 trips switch LS–3.

When the starter relay for the motor that operates motor 12 is operated, contact CCR closes to energize coil 1TR and coil EC and contact 1–1TR closes. After a few seconds contact 1–2TR closes but coil 3CR is not energized because contact LS–3–1 is open. Because switch LS–4 is closed, coil 4–LRC is energized when coil 1CR closes contact 1–1CR. The contact 4–1LCR opens when coil 4–LCR is energized and this prevents the energization of coil 5CR. However, contact 4–2LCR closes. Less than 6 seconds after the energization of coil 1TR, contact 1–3TR closes and this results in the energization of coil 6CR to operate motor 55 for the travel in the reverse direction of carriage 13. The contact 6–2CR closes to hold coil 6CR energized when contact 1–3TR opens. The reverse travel of carriage 13 continues until operator 87 trips switch LS–6 to open contact LS–6–1 for the deenergization of coil 6CR and to close contact LS–6–2 for the energization of coil 4–UCR. The energization of coil 4–UCR results in the opening of contact 4–2LCR. The contact 6–2CR opens. When coil 4–LCR was energized, contact 4–3LCR opened and the energization of coil 4–UCR results in the closing of contact 4–3LCR. Near the end of the cycle of operation of the timer having coil 1TR contact 1–4TR closes for a brief period of time and, with contact 4–3LCR now closed, coil 7CR is energized. The contact 7–2CR of the holding circuit for coil 7CR now closes so that coil 7CR remains energized after contact 1–4TR opens. The motor 45 is operated upon the energization of coil 7CR until cam 84 trips open switch LS–7. The vacuum frame is now in the lowered tilted position with vacuum cups 22 and 24 facing and abutting the outer glass sheet of stack S. The contacts 1–5TR and 1–6TR closed and opened before contact 4–7LCR closed upon the closing of switch LS–6–2 to energize coil 4–UCR. Thus, solenoids SV3 and SV4 are not energized. When coil 4–UCR is energized, contact 4–6LCR closes to energize solenoids SV1–B and SV2–B thereby providing vacuum in cups 22 and 24.

The conveyor 12 stops in its cycle of operation before contact 1–1TR opens at the completion of the cycle of the sequence timer. When conveyor 12 is started again, contact CCR is closed. This reenergization of coil 1TR results in a new cycle for the closing and opening of the contacts of the sequence timer. The new cycle has contact 1–1TR closed for the full period of time.

The contact 4–7LCR is closed. The contacts 1–5TR and 1–6TR close at the start of the new cycle. The air plunger 37 is extended forwardly to the sheet-abutting plane of the vacuum cups to abut sheet G when contact 1–5TR closes to energize solenoid SV3 thereby moving plunger 37 until it abuts the glass sheet. At the same time contact 1–6TR closes to energize solenoid SV4 thereby retracting the piston rod of air cylinder 78 to move plates 23 and 25, tie plates 26 and 27 and vacuum cups 22 and 24 in an upward direction parallel to the inclined stack S. The engaged glass sheet moves upwardly with the cups. The contact 1–6TR opens. The contact 1–5TR remains closed for a period of time. When contact 1–5TR opens, plunger 37 is urged by the spring of air cylinder 35 to move to the retracted position where it is out of engagement with the glass sheet.

Before contact 1–5TR opens, contact 1–2TR closes to energize coil 3CR because contact LS–3–1 had closed when frame 15 was moved from the horizontal position to the inclined position. Although contact 1–2TR closes shortly thereafter, the energization of coil 3CH continues through holding contact 3–1CR until cam 83 trips switch LS–3 to open contact LS–3–1. This occurs after the operation of motor 45 by the energization of coil 3CR has given a half revolution to shaft 47 to lift vacuum frame 15 to the raised horizontal position. Shortly thereafter contact 1–3TR closes to energize coil 5CR. When contact 1–3TR opens, the energization of coil 5CR continues through contact 1–1CR. Thus, motor 55 moves carriage 13 forward, i.e., from the right to the left as viewed in FIG. 3 until contact 4–1LCR opens when coil 4–LCR is energized by operator 87 tripping switch LS–4.

When coil 4–LCR is energized, contacts 4–4LCR and 4–5LCR close. The closing of contact 4–5LCR does not energize solenoid SV2–A because switch LS–8 is open. However, because contact 1–2SW is closed the closing of contact 4–4LCR results in the energization of solenoids SV1–A and SV2–A to release the vacuum in cups 22 and 24. The large glass sheet falls from frame 15 a very short distance onto belt 67 of conveyor 12.

When frame 15 was moved to the horizontal position, cam 38 tripped switch LS–3 as mentioned above. This closed contact LC–3–2 to energize solenoid SV5. The solenoid SV4 had already been deenergized when contact 1–6TR opened. Upon the energization of solenoid SV5, air cylinder 78 was operated to move the vacuum cups to the right (as viewed in FIG. 1) as soon as vacuum frame 15 is moved from the inclined position to the horizontal position. This returns the vacuum cups etc. to the position with respect to arms 29 so that they can be lifted later when arms 29 are again in the inclined position.

The energization of coil 4–LCR closes contact 4–2LCR and the deenergization of coil 5CR upon the opening of contact 4–1LCR closes contact 5–2CR. This does not result at this time in the energization of coil 6CR because contact 1–3TR has already opened. When contact 1–7TR later closes coil 6CR is energized to operate motor 55 whereby carriage 13 is moved in reverse, i.e., from left to right (as viewed in FIG. 3) until switch LS–6 is tripped to open contact LS–6–1. The contact LS–6–2 closes to energize coil 4–UCR whereby contact 4–3LCR closes. Thus, when contact 1–4TR closes, coil 7CR is energized. Although contact 1–4TR opens, the energization of coil 7CR continues through now closed holding contact 7–2CR. The energization of coil 7CR operates motor 45 to move frame 15 to the lower inclined position at which cam 84 trips open switch LS–7 to stop motor 45.

When switch LS–6–2 closes to energize coil 4–UCR, contact 4–6LCR also closes to energize solenoids SV1–B and SV2–B so that the vacuum cups 22 and 24 are placed in communication with the vacuum source. The timer having coil 1TR has completed its cycle of operation and conveyor 12 has stopped operating because it has placed the large glass sheet deposited on belt 87 in position for the scoring operation.

When the scoring or cutting operation is completed, conveyor 12 is restarted thereby closing contact CCR to energize coil 1TR and this results in the closing of contacts 1–5TR and 1–6TR to energize solenoids SV3 and SV4. This is the beginning of a new cycle of operation of the apparatus for large sheets.

When using the apparatus to remove at one time two smaller sheets, one each from two stacks on pallet 19, the selector switch is changed so that contacts 1–1SW, 1–2SW and 1–3SW are open. It is assumed that pallet 19 has been placed on conveyor 11 with two stacks loaded on the pallet and conveyor 11 has moved the pallet to the position where the outermost glass sheet of one of the stacks has tripped open switch LS–1.

The manual valves connecting pipes 88 to the 4-way valves having solenoids SV1–A and SV1–B and having solenoids SV2–A and SV2–B are closed. The manual valves connecting some of pipes 89 and some of pipes 90 to these 4-way valves are open. With this arrangement only vacuum cups 22 and 24 which are connected to all pipes 89 and all pipes 90 are to be utilized. The manual valves, that connect air cylinders 34 to the 3-way valve having solenoid SV3, are open and the manual valve connecting air cylinder 35 to this 3-way valve is closed, so that later plungers 36 will later cooperate with the vacuum cups to bow the outermost small glass sheets of the two stacks to break the natural vacuum between them and the adjacent small glass sheets.

It is assumed in this instance that carriage 13 is located initially so that limit switch LS–5 is tripped by operator 87. In this position carriage 13 is located as shown in FIG. 3. The vacuum frame is in the raised horizontal position so that cam 83 is tripping switch LS–3. The coil 1CR is energized, as is assumed above, to provide energization of coil 3CR for the operation of conveyor 11 until switch LS–1 is opened. The coil 4–LCR is energized because contact LS–5–1 is closed. Thus, contact 4–1LCR is opened. The coil 5CR cannot be energized when contact 1–3TR closes, as described below.

When conveyor 12 is started, contact CCR closes to energize coil 1TR. When contacts 1–5TR and 1–6TR close, this has no effect on solenoids SV3 and SV4 at this time, because contact 4–7LCR is now open. The contact 1–2TR closes but contact LS–3–1 is open with frame 15 in the horizontal position. Thus, coil 3CR is not energized at this time. When contact 1–3TR closes, coil 5CR is not energized because contacts 4–1LCR and LS–5–2 are open. However, upon the closing of contact 1–3TR, coil 6CR is energized because contacts 4–2LCR, LS–6–1 and 5–2CR are closed.

The motor 55 is operated in the reverse direction upon the energization of coil 6CR. Although contact 1–3TR opens, coil 6CR remains energized through contact 6–2CR until operator 87 trips switch LS–6 thereby opening the contact LS–6–1 and closing contact LS–6–2. The closing of the contact LS–6–2 results in the closing of contact 4–3LCR, so that, when contact 1–4TR closes, coil 7CR is energized to start the lowering of frame 15. Although contact 1–4TR opens shortly thereafter, energization of coil 7CR continues through holding contact 7–2CR until switch LS–7 is tripped open by cam 84. At the same time that contact 4–3LCR closes, contact 4–6LCR closes to energize solenoids SV1–B and SB2–B to provide vacuum through hoses 89 and 90. The apparatus now has frame 15 tilted with vacuum at the appropriate cups. The contact 1–1TR opens to deenergize coil 1TR.

When conveyor 12 restarts, contact CCR closes to energize to start another cycle for the sequence timer. The contacts 1–5TR and 1–6TR closes to energize solenoids SV3 and SV4 because contact 4–7LCR is closed. The energization of solenoid SV3 results in the movement of plungers 36 to abut the two small outermost glass sheets of the two stacks. These outermost sheets are lifted in an inclined direction when solenoid SV4 is energized to operate air cylinder 78. After the lifting operation and while plungers 36 are still forced against the two glass sheets, contact 1–2TR closes to energize coil 3CR because contact LS–3–1 closed when arms 29 were lowered. The energization of coil 3CR results in the raising of frame 15 until cam 83 trips switch LS–3 to open contact LS–3–1. The contact LS–3–2 is then closed to energize solenoid SV5 so that air cylinder 87 is operated in the opposite direction.

When contact 1–3TR closes, coil 5CR is energized because contact 4–1LCR closed when coil 4–UCR was energized. Shortly thereafter contact 1–3TR opens but the energization of coil 5CR, which operates motor 55 for the forward travel of carriage 13, continues through holding contact 5–1CR until operator 87 trips switch LS–5 to open contact LS–5–2.

When switch LS–5 is tripped, contact LS–5–1 is closed to energize coil 4–LCR thereby closing contacts 4–4LCR and 4–5LCR. The closing of contact 4–4LCR energizes solenoid SV1–A to operate the 4-way valve having this solenoid so that tubes 89 are no longer communicating with the vacuum source. Instead they are connected to the exhaust outlet of the 4-way valve. As a result, the trailing smaller glass sheet, which is directly above conveyor 12 as seen in FIG. 3, is released and drops the small distance onto moving belt 87 of conveyor 12. The solenoid SV2–A is not energized at this time because contact 1–2SW is open.

Because switch 1–3SW is open, the later closing of contact 1–7TR does not result in the energization of coil 6CR. Accordingly, vacuum frame 15 remains at the position shown in FIG. 3 until long after the deposited glass sheet has been moved to the cutting station and the cutting or scoring operation has been completed. While conveyor 12 is not operating contact 1–4TR closes and then opens at the completion of the cycle of the sequence timer. During the period that contact 1–4TR is closed coil 7CR cannot be energized because contact 4–3LCR is still open.

When conveyor 12 is started again in its operation, the sequence timer is again initiated for its cycle. The closing of contacts 1–5TR and 1–6TR does not energize solenoids SV3 and SV4 because contact 4–7LCR is open. When contact 1–2TR closes for its short period, it does not energize coil 3CR because contact LS–3–1 is open.

When contact 1–3TR closes, coil 6CR is energized because contact 4–2LCR is closed. Thus, motor 45 is started to move carriage 13 in the reverse direction. In this reverse movement, operator 87 trips closed for a brief interval switch LS–8 to energize solenoid SV2–A thereby releasing the vacuum in those cups 22 and 24 which have engaged the second glass sheet. This occurs when the second glass sheet is above belt 87 of conveyor 12 whereby the glass sheet is deposited on conveyor 12 and moved to the cutting station.

When carriage 13 has moved to the place where operator 87 trips switch LS–6, contact LS–6–1 opens to stop motor 55 and contact LS–6–2 closes to energize coil 4–UCR whereby contact 4–3LCR is closed. When contact 1–4TR closes, coil 7CR is energized to operate motor 45 for the lowering of frame 15 until cam 84 trips open switch LS–7.

When contact 4–3LCR closed, contact 4–7CR also closed, so that in the next sequence of the timer having coil 1TR solenoids SV3 and SV4 will be energized by the closing of contact 1–5TR and 1–6TR. The contact 4–6LCR also closed, when the reverse drive of carriage 13 ceased, to energize solenoids SV1–B and SV2–B.

The frame 15 is now inclined with vacuum cups 89 and 90 abutting the next glass sheets of the two stacks. When the cutting operation of the last glass sheet, which was released onto conveyor 12, is completed, conveyor 12 is restarted thereby initiating the entire cycle of operations described above from the moment that solenoids SV3 and SV4 were energized.

In the electrical circuits various contacts are present to prevent energization of coils of starter relays when other coils are energized. For example, when coil 7CR is energized contact 7–1CR is open to prevent energization of coil 3CR. When coil 3CR is energized contact 3–2CR is open. When coil 5CR is energized contact 5–2CR is open. When coil 6CR is energized contact 6–1CR is open.

Various modifications of the apparatus of the present invention will be apparent to one skilled in the art from the description of the preferred embodiment which has has been presented above solely for the purposes of illustration. The invention is limited only by the claims which follow.

We claim:

1. An apparatus for removing glass sheets from a stack which comprises a first conveyor to move a glass sheet in a horizontal path, actuated first power means to operate said first conveyor, a pallet having a side inclined rearwardly to support the stack in front of the side in an inclined position, a second conveyor to support the pallet at a horizontal plane lower than and to move said pallet in a horizontal path parallel to the horizontal path provided to a sheet by said first conveyor, actuated second power means for said second conveyor, a supporting structure, a carriage, means on said supporting structure mounting the carriage for horizontal movement above said first and second conveyors and normal to the path of movement of said pallet, actuated third power means to provide the horizontal movement of said carriage, a vacuum frame including vacuum cups with sheet-engaging surfaces in a common plane, means to support said vacuum frame for pivotal movement about a horizontal axis between a raised horizontal position and a lowered inclined position, said axis being parallel to the movement of said carriage, actuated fourth power means to move said vacuum frame between the raised position and the lowered position, actuated means to communicate said vacuum cups to a vacuum source during movement of said frame from the raised position to the inclined lowered position, means responsive to actuation of said first power means for actuation of said fourth power means to raise said vacuum frame and for actuation of said third power means to move said carriage and said raised vacuum frame from a position above said second conveyor to a position above said first conveyor, means responsive to movement of said carriage to a position above said first conveyor to release vacuum in said cups, to actuate said third power means to move said carriage and said vacuum frame to a position over said second conveyor and to actuate said fourth power means to lower said vacuum frame to an inclined position, and means responsive to a leading surface of a stack of glass sheets on said pallet to actuate said second power means to move the stack for placement of the next sheet at a position to be engaged by said vacuum cups after each time a sheet of the stack is removed.

2. The apparatus of claim 1 wherein said vacuum frame has at least two rows of vacuum cups having sheet-engaging surfaces in a common plane and wherein the apparatus includes a plunger having a free end and mounted on said frame between said rows of vacuum cups and means to move said plunger between said first and second positions at which positions the free end is on opposite sides of said common plane, whereby said vacuum cups engaging a sheet in communicating with the vacuum source upon movement of said frame provide a force in one direction at the margins of the sheet and said plunger opposes movement in said direction to bow the sheet about an axis in a plane between said rows.

3. An apparatus for removing glass sheets from two adjacent stacks comprising a first conveyor to move a glass sheet in a horizontal path, actuated first power means to operate said first conveyor, a pallet having a side inclined rearwardly to support the stacks in front of the side in an inclined position and in side-by-side relationship, a second conveyor to support the pallet at a horizontal plane lower than and to move said pallet in a horizontal path parallel to the horizontal path provided to a sheet by said first conveyor, actuated second power means to operate said second conveyor, means responsive to a leading surface of one of said stacks of glass sheets on said pallet to actuate said second power means to move the stack for placement of the next sheet of each stack at a predetermined position, a supporting structure, a carriage, means on said supporting structure for mounting the carriage for horizontal movement above said first and second conveyors and normal to the path of movement of said pallet, actuated third power means to provide the horizontal movement of said carriage, a vacuum frame including two sets of two rows of vacuum cups sheet-engaging surfaces in a common plane, said sets of rows of cups being adjacent and parallel to each other, actuated means to communicate said vacuum cups with a vacuum source, actuating means responsive to positioning of said vacuum cups and said carriage above said second conveyor to actuate said communicating means, a plunger having a free end and mounted on said frame between said rows of said vacuum cups of each set, means to move both of said plungers between first and second positions at which positions the free end of each plunger is on opposite sides of said common plane, means to support said vacuum frame for pivotal movement about a horizontal axis between a raised horizontal position and a lowered inclined position, said axis being parallel to the movement of said carriage, actuated fourth power means to move said vacuum frame between the raised position and the lowered position, means responsive to a first actuation of said first power means for actuation of said fourth power means to raise said vacuum frame and for actuation of said third power means to move said carriage and said raised vacuum frame from a position above said second conveyor to a position above said first conveyor, means responsive to arrival of said carriage at said position above said first conveyor to release vacuum in one only of said sets of vacuum cups to deposit one of the sheets on the first conveyor, means responsive to a next actuation of said first power means for actuation of said third power means to move said carriage and said vacuum frame from the position over said first conveyor to a position over said second conveyor and to actuate said fourth power means to lower said vacuum frame to an inclined position at which said sets of cups have the common plane at the outer surface of the sheet at the predetermined position, and means responsive to movement of said carriage from a position over said first conveyor to a position over said second conveyor to release vacuum in the second set of said cups for depositing the second sheet on said first conveyor.

4. The apparatus of claim 3 and further including a plunger having a free end and mounted on said frame between said rows of said vacuum cups of each set and means to move both of said plungers between first and second positions at which positions the free end of each is on opposite sides of said common plane and wherein said first initiation of actuation of said first conveyor operates said plunger-moving means to move said plungers toward the glass sheets to provide a force in one direction, whereby movement of said vacuum frame away from said stack provides a force by said sets of cups in the opposite direction to the force provided by each plunger to bow each glass sheet about an axis in a plane between said rows of each set.

5. An apparatus for removing sheets of material from a stack comprising a vacuum frame including vacuum cups having sheet-engaging surfaces in a common plane and adapted to engage a sheet of material at opposite margins; a vacuum source; means, responsive to positioning of said vacuum cups for engagement with a sheet of an inclined stack of sheets, to communicate said vacuum cups with said vacuum source; a plunger having a free end and mounted on said frame centrally of said vacuum cups and adapted to engage the sheet of material centrally thereof; means to move said plunger between first and second positions at which the free end is on opposite sides of said common plane; power means to move said frame from said stack whereby said vacuum cups engaging a sheet and communicating with the vacuum source provide a force in one direction at the margins of the sheet upon movement of said frame and said plunger opposes movement in said direction to bow the sheet; means to thereafter tilt the vacuum frame from a sheet-engaging position to a second position; and means to thereafter automatically break the vacuum in the vacuum cups to release the sheet of material.

References Cited in the file of this patent
UNITED STATES PATENTS

| | | |
|---|---|---|
| 853,910 | Tyden | May 14, 1907 |
| 1,911,884 | Darbaker | May 30, 1933 |
| 2,197,817 | Theiss | Apr. 23, 1940 |
| 2,596,386 | Egge | May 13, 1952 |
| 2,745,665 | Labombarde | May 15, 1956 |
| 2,749,119 | Battey | June 5, 1956 |
| 2,827,178 | Pagdin | Mar. 18, 1958 |
| 2,838,898 | Owen | June 17, 1958 |

UNITED STATES PATENT OFFICE
CERTIFICATE OF CORRECTION

Patent No. 3,094,322                June 18, 1963

Fred W. Kocher et al.

It is hereby certified that error appears in the above numbered patent requiring correction and that the said Letters Patent should read as corrected below.

Column 3, line 21, for "as" read -- at --; column 11, line 66, for "4-LRC" read -- 4-LCR --; column 12, line 51, for "3CH" read -- 3CR --; line 73, for "LC-3-2" read -- LS-3-2 --; column 14, line 18, for "SB2-B" read -- SV2-B --.

Signed and sealed this 10th day of November 1964.

(SEAL)
Attest:

ERNEST W. SWIDER
Attesting Officer

EDWARD J. BRENNER
Commissioner of Patents